Dec. 12, 1950 R. M. ULRICH 2,533,640
QUICK DISCONNECT HYDRAULIC COUPLER
Filed Oct. 25, 1947 2 Sheets-Sheet 1
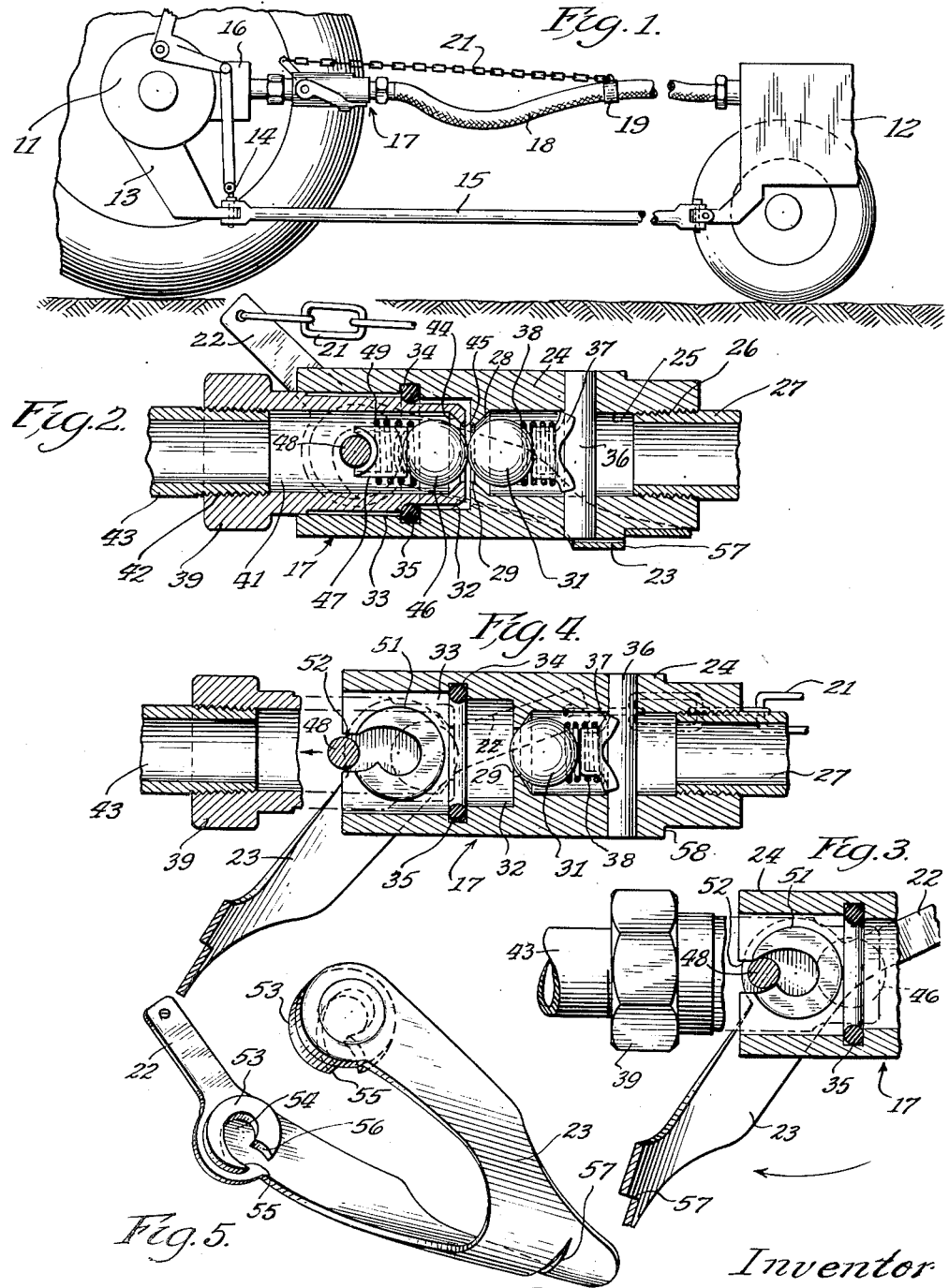
Inventor
Raymond M. Ulrich
By Alois W Graf
Atty.

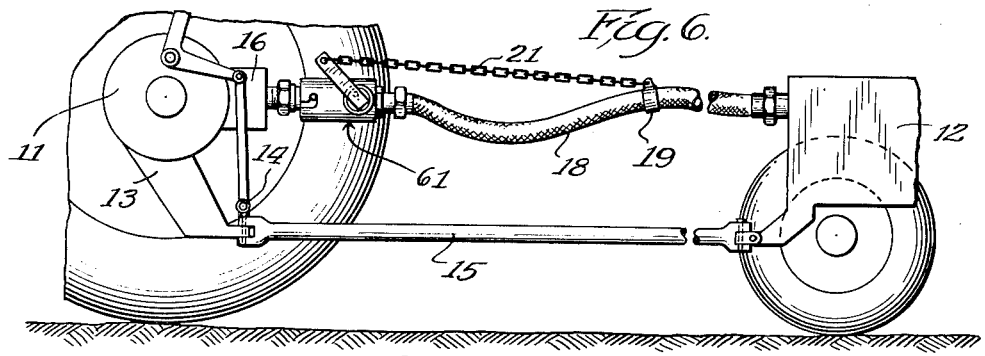
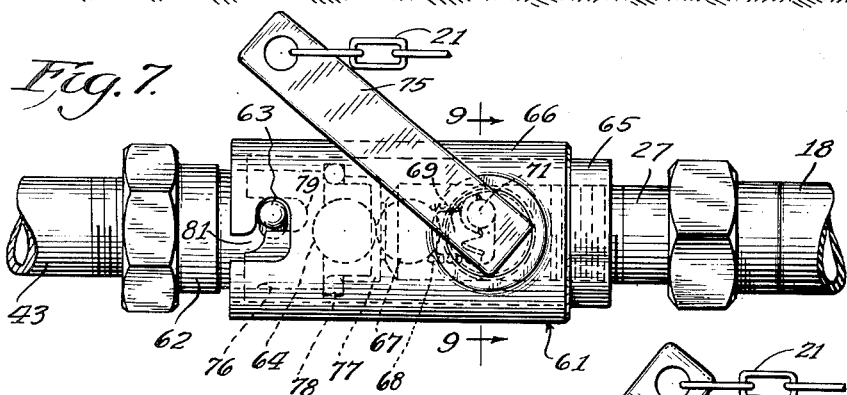
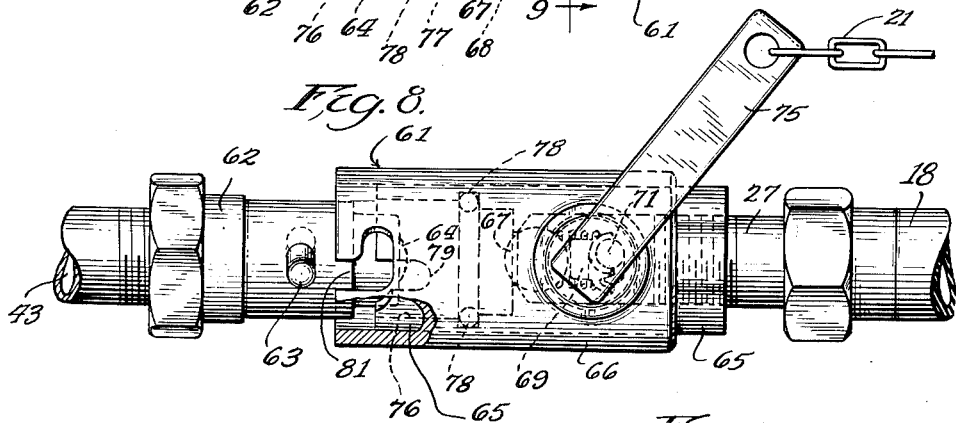
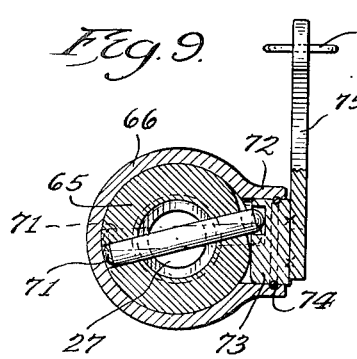
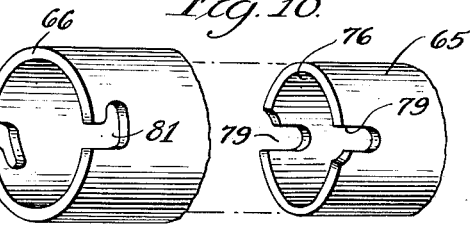

Patented Dec. 12, 1950

2,533,640

UNITED STATES PATENT OFFICE 2,533,640

QUICK DISCONNECT HYDRAULIC COUPLER

Raymond M. Ulrich, Roanoke, Ill.

Application October 25, 1947, Serial No. 782,050

3 Claims. (Cl. 284—19)

The present invention relates to a conduit coupling device which is particularly suited for coupling and uncoupling rapidly hydraulic conduits having fluid therein under pressure.

In the use of various types of hydraulic equipment it frequently is desired to couple or uncouple hydraulic conduits while the fluid therein is under pressure. A coupling to be suitable for this purpose must seal the ends of the conduit to prevent the escape of fluid therefrom, when uncoupled. In the use of certain types of machinery it is particularly desirable to provide an arrangement whereby in response to a strain or excessive linear motion the hydraulic conduits are uncoupled automatically. Such an arrangement, however, must positively lock the coupling in coupled relation irrespective of the amount of hydraulic pressure within the conduit. In other words, an increase in the pressure of the fluid within the hydraulic conduit must not produce a disengagement of the coupler.

For example, in connection with hydraulically operated farm machinery, which is becoming quite common in use, it is desired to provide a quick disconnect coupling between the hydraulic power unit which is usually located on the tractor, and the hydraulically operated farm equipment which is being drawn by the tractor. Many farm implements such as plows, disks, harrows and other machines are now adjusted by hydraulic mechanisms controlled from a hydraulic power unit mounted on the tractor. In a case where the tractor is drawing a plow or harrow it frequently occurs that the plow or harrow will engage and become lodged on some object such as a stump, rock or the like. When this happens an excessive strain is placed upon the hitch between the farm implement and the tractor which is so arranged as to release the hitch when the stress or strain exceeds a predetermined value. When this happens it is, of course, necessary to make provision for uncoupling the hydraulic conduit extending between the implement and the tractor.

It, therefore, is an object of the present invention to provide an improved coupling for hydraulic conduits which may be connected or disconnected while the hydraulic conduit is under fluid pressure.

Another object of the present invention is to provide an improved coupling for hydraulic conduits which will automatically disengage the coupling upon the application of a linear force to a portion of the coupling.

Still another object of the present invention is to provide an improved hydraulic coupling unit which makes a seal between the two portions of the coupling unit prior to interconnecting the fluid conduit.

Still another object of the present invention is to provide a coupling for hydraulic conduits which is locked into position by a cam.

Other and further objects of the present invention subsequently will become apparent by reference to the following description taken in conjunction with the accompanying drawings wherein:

Figure 1 illustrates the application of the present invention to a conduit extending between a tractor and a farm implement;

Figure 2 is a cross-sectional view in an axial direction through the hydraulic conduit coupler employed in the arrangement shown in Figure 1;

Figure 3 is a partial view of the coupler shown in Figure 2 illustrating the position of the parts at one stage in an uncoupling or disconnecting position;

Figure 4 is a cross-sectional view similar to Figure 2 showing the positions of the parts when the coupling has been substantially separated or disconnected;

Figure 5 is a perspective view of a cam actuator which serves to move the two portions of the coupling unit into locked or unlocked relation;

Figure 6 is a view similar to Figure 1 showing another form of the invention;

Figure 7 is a side view of the invention employed in Figure 6 illustrating certain details thereof when in coupled relation;

Figure 8 is a view similar to Figure 7 showing the coupler in uncoupled relation;

Figure 9 is a cross-sectional view as seen in the direction of the arrows along the line 9—9 on Figure 7 explanatory of the operation; and Figure 10 is an exploded view of two of the elements of the female coupling member to illustrate their construction.

In Figure 1 there has been shown or represented the rear portion of a tractor to which has been hitched a farm implement 12. The farm implement 12 may be a plow, a harrow, a planter or other implement which is provided with controls actuated by hydraulic cylinders. The implement 12 is connected to the tractor by a drawbar 13 by means of a pin 14 which passes through the tongue or connecting member 15. The tractor 11 is provided with a hydraulic power unit 16 which is to be connected by means of a coupling device 17 and a conduit 18 to the hydraulic equipment on the farm implement 12. The hydraulic conduit 18 is provided with a clamp 19 which is secured to a chain 21 which in turn is connected to an actuating lever of the coupling unit 17.

The chain 21 is connected to an arm 22 of a locking and unlocking lever 23 carried by the female coupling member 24. The female coupling member 24 has an axial bore 25 provided with a threaded portion 26 for engaging the threaded extremity of a nipple 27 which is carried by the flexible conduit 18. The axial bore 25 extends to a tapered portion 28 which connects with a reduced diameter portion 29. The reduced diameter portion 29 is an opening which is adapted to be sealed by a closure ball 31.

The opening 29 communicates with an enlarged axial bore 32 which is connected to still another bore of enlarged diameter 33. Interposed between the bore 32 and 33 is an annular recess 34 which carries a packing ring 35 commonly called an O-ring. The female member 24 is provided with suitable transversely arranged opening into which is fitted a pin 36 which carries a limit stop 37 which is surrounded by a spring 38. The spring 38 biases the ball 31 toward the closed position. The limit stop 36 limits the movement of the ball 31 in a direction towards the right as seen in Figures 2 and 4. Preferably the limit stop 37 is formed in accordance with the teaching set forth in my co-pending application for a hydraulic conduit coupler Serial Number 762,048, filed July 19, 1947.

The male coupling member 39 is provided with an axial bore 41 which has a threaded portion 42 which engages the threaded nipple 43 of a conduit or pipe connected to the power unit 16 of Figure 1. The axial bore 41 terminates in a tapered portion 44 adjacent the end opening 45. The tapered portion 44 is engaged by a closure ball 46. The motion of the closure ball 46 in a direction towards the left as seen in Figure 2 is limited by a limit stop 47 which bears against a transversely arranged pin 48 which passes through the male member 39 and extends a short distance on each side thereof. The stop 47 is surrounded by a spring 49 which bears against the closure ball 46.

The female member 24 is provided with two transversely arranged circular releases or openings 51 which intersect the axial bore 33. Each circular opening 51 is connected to the left extremity of the female member 24 by a slot 52.

The recesses or openings 51 of the female member 24 receive cam members 53 which are mounted on opposite sides of the locking lever 23. Each cam member 53 has a central recess 54 which is generally of circular configuration which communicates with a slot 55 extending to the outer periphery of the cam member 53. One surface of the slot 55 has a curved configuration 56 which serves as a limit stop for the movement of the operating lever 23 in the uncoupling or unlocking operation. The operating lever 23 has an inwardly pressed portion 57 which is arranged to engage in snap action a shoulder 58 formed adjacent one extremity of the female member 24 when the lever 23 is in locking or coupled position.

The arrangements illustrated in Figures 1 to 5 of the drawings permit hydraulic conduits to be coupled and uncoupled while the fluid in the conduits is under pressure. The coupled relationship is illustrated in Figure 2 from which it will be noted that the closure balls 31 and 46 are in contact with each other. Each of the balls, therefore, is displaced from its corresponding seat so as to permit fluid to flow from one conduit to another through the coupling unit. For purposes of clarity in disclosure of the drawing the clearance between the end of the male member 39 and the bottom of the bore 32 of the female member 24 has been slightly exaggerated. Thus the openings 45 and 29 of the male and female members respectively are in alignment. Any fluid which may flow from these openings into the bore 32 is stopped by the O-ring 35. Since only a few thousandths of an inch clearance are provided between the cooperative portions of the outer extremity of the male member 39 and the adjacent portions of the female member 24, it will be appreciated that very little fluid is contained within the bore 32.

It now may be assumed that the farm implement 12 has struck some object or obstruction which places sufficient tension upon the coupling bar 15 so as to uncouple the implement from the draw bar 13 of the tractor 11. This action produces a tension in the chain 21 which thereby actuates the lever 22. This brings about a rotation of the locking lever 23.

The locking member 23 rotates on the bearing formed by the cam members 53 in the transversely arranged openings or recesses 51 of the female member 24. The rotation of the cam members 53 displaces the extremities of the pin 48 in a direction toward the left as seen in the drawing. The initial movement of the rotation of the coupling lever 23 moves the male member 39 a distance sufficient to permit the closure balls 31 and 46 to be restored to their respective seats. The slight movement of the two coupling members relative to each other, however, does not unseal the coupling because of the location of the O-ring 35. The continued rotation of the locking member 23 is illustrated in Figure 3 which continues until the pin 48 is substantially in the position shown. In the position shown in Figure 3 the arcuate surface 56 of the slot or recess 55 in the cam member 53 now engages the pin 48 thereby stopping the clockwise rotation of the coupling lever 23.

The continued strain on the chain 21 now produces further longitudinal motion of the female member 24 so that the pin 48 may escape the slot 52 in the extremity of the female member 24 as shown by Figure 4. From the representation of the parts in Figure 4 it will be noted that just prior to this position the male member 39 has passed out of engagement with the O-ring 35. The respective conduits 27 and 43 which contain hydraulic fluid under pressure, however, are sealed by the action of the closure balls 31 and 46. The coupling member now is free to permit the female member 24 to become entirely disassociated from the male member 39.

Assuming now that the tractor has been stopped and backed up sufficiently to recouple the draw bar 13 to the member 15, the farm implement 12 may be disengaged from the obstruction. Such operation having been concluded it is now possible to recouple the conduit 18 with the hydraulic power supply 16. This may be done in spite of the fact that the closure balls in the male and female portions of the coupling unit are subjected to hydraulic pressure. In recoupling the two portions of the coupling unit they are brought together in a relation similar to that shown in Figure 4. A slight movement of the female member 24 in a direction toward the left will now place the pin 48 in engagement with the cam member 53 so that by actuation of the coupling lever 23 the pin 48 will be moved in toward the central recess 54. This brings about a movement of the female member 24 in a direction toward the left. This movement continues until the coupling lever 23 has been moved up to the position shown in Figure 2 whereupon the coupling member 23 is retained in position by the resilient detent 57 which is in engagement with the set 58.

Figure 6 of the drawing illustrates another embodiment of the present invention employing a coupling member 61 to interconnect the hydraulic conduit 18 and the power unit 16 of the tractor. The coupling unit 61 consists of a male member 62 having a construction similar to the male member 39 of the preceding embodiment. The male member 61 has a transversely arranged pin 63. The male member is sealed by a closure ball 64.

The female member consists of a body 65 surrounded by a sleeve 66. The female member is provided with a closure ball 67 engaged by a spring 68 which surrounds a saddle 69 resting against a transversely arranged pin 71. As may be seen from Figure 9 the sleeve 66 is provided at one side with a boss 72 for receiving a cam member 73 which is retained in position by a lock ring 74. The cam member 73 is connected to an operating lever 75 which in turn is connected to the chain 21. The female body member 65 is provided adjacent one extremity with an enlarged axial bore 76 which is in communication with a reduced diameter bore 77. An O-ring 78 is located at the juncture of the two bores 76 and 77. The female body member 65 as may be seen from Figure 10 has at one end a shell-like configuration which is provided with a plurality of transversely arranged slots 79 which are arranged to be engaged by the pin 63 of the male member 62. The sleeve 66 in the proximity of the slot 79 of the female body member 65 is provided with a pair of bayonet slots 81. The bayonet slots 81 engage the outer extremities of the pin 63 of the male member 62.

An examination of Figure 7 shows that in the coupled or locked position the sleeve 66 is rotated relative to the body member 65 so as to positively lock the pin 63 in a position to prevent the disengagement of the male and female coupling portions. When tension is applied to the chain 21 the coupling lever 75 is rotated in a clockwise direction as seen in Figure 7. The rotation of the lever 75 produces rotation of the cam 73 which is in engagement with one extremity of the transversely arranged pin 71 of the female body member 65. This rotation of the cam 73 produces an angular rotation of the body 65 relative to the sleeve 66 so as to displace the pin 71 from the solid line position shown in Figure 9 to the dotted line position. This action brings the extremity of the pin 63 of the male member 62 in alignment with that portion of the bayonet notch 81 extending to the outer extremity of the sleeve 66.

In order to illustrate the relative positions of the components of the coupling members it has been convenient to show the male member 62 as having been rotated a small amount in Figure 8 so as to show more clearly the positions of the components in the female member without the confusion of a large number of perspective lines. It, of course, will be appreciated that where the male member 62 is rigidly positioned as by a positive pipe connection to the hydraulic power unit 16, that the male member 62 does not become displaced angularly. It will be noted that the arrangement illustrated in Figures 6 to 10 inclusive operates in a manner similar to the previous embodiment in that a cam member connected to an operating lever produces a coupling and uncoupling action of the male and female portions of the coupling unit 61. It also will be noted that this arrangement can be used for coupling and uncoupling hydraulic conduits under pressure. The location of the O-ring 78 is such that a seal is made between the male and female portions of the coupling unit prior to the time that the ball closures 64 and 67 are displaced from their respective seats.

While for the purpose of describing and illustrating the present invention, certain embodiments have been illustrated in the drawings, it is to be understood that the invention is not to be limited thereby since such variations in the components employed and their arrangement are contemplated as may be commensurate with the spirit and scope of the invention set forth in the following claims.

What I desire to protect by United States Letters Patent is claimed as follows:

1. A hydraulic coupler for conduits having therein fluid under pressure comprising male and female portions each provided with a self-closing valve comprising a seat and a closure ball therefor, said male portion having two transverse outwardly extending projections, a pair of cam members carried by recesses in said female portion, said cam members having recesses for engaging said projections to move said male portion to and from said female portion, and a pivoted bell crank lever connected to said pair of cams, said bell crank lever being arranged to be responsive to axial strain on said conduits, to move said cam members to release said male portion.

2. A hydraulic coupler for conduits having therein fluid under pressure comprising male and female portions each provided with a self-closing ball valve comprising a seat and a closure ball therefor, said male portion having a transverse pin supporting said seat and extending outwardly to form two projections, a pair of cam members carried by recesses in said female portion, said cam members having recesses therein for engaging said projections to move said male portion to and from said female portion, and a pivoted bell crank lever connected to said pair of cams, said bell crank lever being arranged to be responsive to axial strain on said conduit to move said cam members to release said male portion.

3. A hydraulic coupler for connecting and disconnecting conduits under fluid pressure comprising male and female portions each provided with a self-closing valve arranged to seal said conduits when said portions are uncoupled, said male portion having a pair of outwardly extending transversely arranged projections, means mounted on said female portion to couple and uncouple said portions including a pivoted bifurcated lever carrying a pair of cams each provided with a recess for engaging said projections, said female portion having a pair of transverse openings, said cams extending inwardly into said openings, said cam recesses each having a surface portion arranged to engage said projections when said portions are being disconnected thereby to limit the movement of said lever.

RAYMOND M. ULRICH.

REFERENCES CITED

The following references are of record in the file of this patent:

UNITED STATES PATENTS

| Number | Name | Date |
|---|---|---|
| 162,169 | Hopkins | April 20, 1875 |
| 398,059 | Leland | Feb. 19, 1889 |
| 804,272 | Schwarz | Nov. 14, 1905 |
| 1,074,244 | Carence et al. | Sept. 30, 1913 |
| 2,307,427 | Smith et al. | Jan. 5, 1943 |
| 2,333,423 | Huffered | Nov. 2, 1943 |